United States Patent [19]

Hecker et al.

[11] Patent Number: 4,591,253
[45] Date of Patent: May 27, 1986

[54] ADAPTIVE VISION SYSTEM

[75] Inventors: Joel Hecker, Port Jefferson Station; Howard Stern, Greenlawn, both of N.Y.

[73] Assignee: Robotic Vision Systems, Inc., East Hauppauge, N.Y.

[21] Appl. No.: 539,725

[22] Filed: Oct. 6, 1983

[51] Int. Cl.⁴ ............................. G03B 9/56; G03B 9/02
[52] U.S. Cl. ................................. 354/227.1; 354/271.1
[58] Field of Search ..................... 354/227.1, 435, 453, 354/432, 483, 271.1, 270; 350/331 R, 332, 333, 349, 312, 314

[56] References Cited

U.S. PATENT DOCUMENTS

| 3,397,023 | 8/1968 | Land | 354/227.1 X |
| 3,555,987 | 1/1971 | Browning | 354/227.1 |
| 3,981,565 | 9/1976 | Karasawa | 350/314 X |
| 3,986,022 | 10/1976 | Hyatt | 354/227.1 X |
| 4,054,890 | 10/1977 | Shimomura | 354/227.1 |
| 4,473,288 | 9/1984 | Onodera et al. | 354/432 |

FOREIGN PATENT DOCUMENTS 1106483  3/1968  United Kingdom ............... 350/314

Primary Examiner—William B. Perkey
Attorney, Agent, or Firm—Max Fogiel

[57] ABSTRACT

Cameras or optical devices requiring shutters to allow light to reach a light sensitive area from an object scene for a prescribed amount of time are provided with an electrically controlled light modulator to replace mechanical shutters. Cameras or optical devices requiring a variable aperture and/or transform filter to adjust the amount of light admitted, depth of focus and/or image enhancement are also provided with electrically controlled light modulators to replace mechanical apertures and transform masks. Both functions may be incorporated into a single electrically controlled light modulator.

6 Claims, 9 Drawing Figures

ADAPTIVE VISION SYSTEM

BACKGROUND OF THE INVENTION

Cameras and other optical devices have used mechanical shutters and apertures for many years. With the advent of liquid crystal devices (LCD) and other electronic light modulators, it is possible to replace the mechanical devices with electrical devices, eliminating moving parts with their attendant problems and limitations.

Cameras employ shutters to expose the light sensitive part of the camera for prescribed periods of time. Electronic light modulators can perform this function without moving parts and as such can operate faster and perhaps in new and interesting ways not practical by mechanical means.

Cameras employ apertures to adjust the amount of light admitted by the camera to its light sensitive area and to vary the depth of focus of the camera. Electronic light modulators can also perform this function without moving parts and can also operate faster and in new and interesting ways not practical by mechanical means.

Cameras often view scenes with a large range of light intensities between the brightest and darkest points within the scene. Mechanical shutters and apertures generally operate on the whole aperture. The flexibility of multiple addressable element electronic modulators can filter the light passing through the aperture by forming mathematical transform masks.

SUMMARY OF THE INVENTION

It is an object of the present invention to overcome the prior-art disadvantages described above.

More particularly, it is an object of the present invention to replace mechanical camera and other optical device shutters and aperture controls with electronic light modulators to eliminate moving parts with their attendant problems and limitations.

In keeping with these objects, and with still others which will become apparent as the description proceeds, one aspect of the invention resides in spacial light modulation and another aspect of the invention resides in temporal light modulation.

A camera aperture using the present invention would affect spacial light modulation via fixed or variable patterns of an electronic light modulator to produce circular, rectangular or special function aperture openings. Both binary (on-off) and analog attenuation functions could be used.

A camera shutter using the present invention would effect temporal light modulation via binary attenuation of the entire aperture using an electronic light modulator.

A single light modulator could combine both functions.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF PREFERRED EMBODIMENTS

Figure 1:
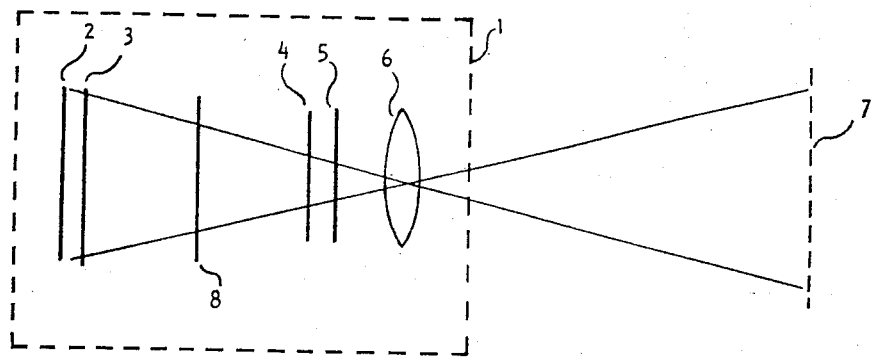
FIG. 1 is a schematic diagram and shows a camera viewing a scene.
Figure 3:
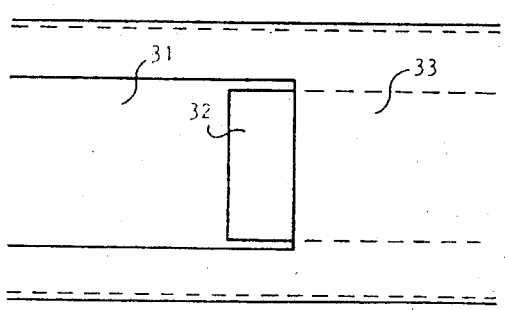
FIG. 3 illustrates a typical prior art focal plane shutter in schematic form.

In FIG. 1, camera 1 has a light sensitive area 2 (film or electronic sensitive surface), a lens 6 to image scene 7 on surface 2, an aperture 5 that controls the depth of focus and the amount of light admitted by the camera, and a shutter 4 (or focal plane shutter 3) that controls the exposure time. In the prior art, shutter 3 or 4 is a mechanical device that initially blocks light from reaching the surface 2. At the time of exposure, the shutter opens and then closes at the end of the exposure time. In one embodiment of the present invention, an electrically controlled light modulator replaces the mechanical shutter 3 or 4. If placed at location 3, the entire aperture would become transparent during the exposure time. This would replace typically, in the prior art, sliding curtains as shown in FIG. 3. The sliding curtains 31 and 33 are set to provide an opening 32 that traverses the light sensitive area 2 of the camera 1 to expose each part of the scene for the prescribed amount of time. As a result, one part of the scene is recorded at a different time than another and fast moving objects are distorted. The present invention eliminates this distortion if the entire aperture 3 becomes transparent for the exposure period.

Figure 2:
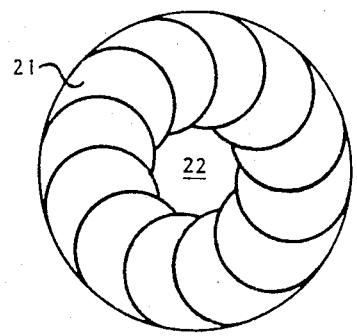
FIG. 2 illustrates a typical prior art aperture.

If the present invention is placed at location 4, the entire aperature could become transparent during the exposure time in a manner analagous to the prior art mechanical shutter, or if the light modulator can accept electrical control signals to selectively make certain areas of the aperture transparent, then the function of the prior art mechanical aperture 5 can be incorporated into the light modulator shutter. The greatest benefits of low cost, compactness and simplicity can be achieved by this single light modulator performing both functions of shutter and aperture control.

Where it is desired to maintain separate shutter and aperture functions, the prior art mechanical aperture 5 which usually has the appearance of FIG. 2, is replaced in the present invention by an electrically controlled light modulator which will have the appearance of FIG. 4.

FIG. 2 is an axial view of a typical mechanical aperture consisting of several moveable metal sheets 21 that can be continuously adjusted to change the size of aperture 22. The aperture 22 is generally of a circular shape that provides a symmetrical depth of focus in the vertical and horizontal directions. The variation of the aperture diameter simultaneously changes the amount of light that may reach the camera's light sensitive surface 2 and the depth of focus.

Figure 4C:
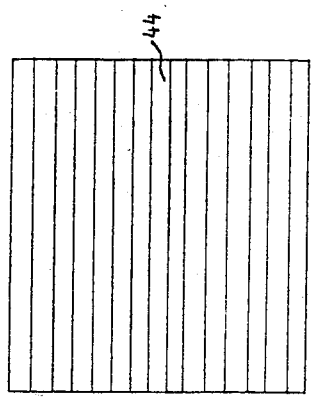
FIGS. 4A–4E show diagrammatic views of various embodiments of the present invention.
Figure 4B:
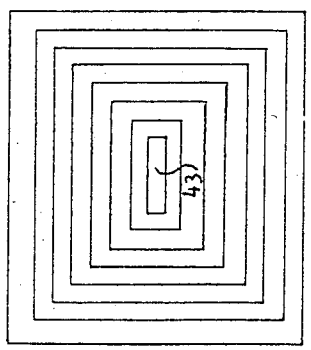
Figure 4A:
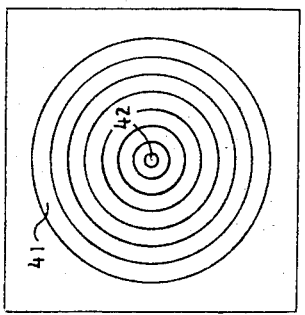
Figure 4D:
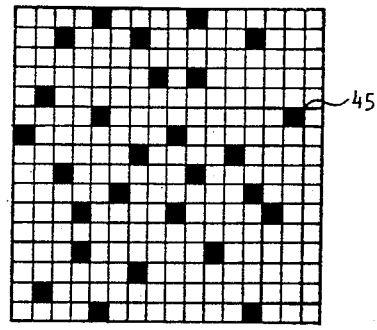
Figure 4E:
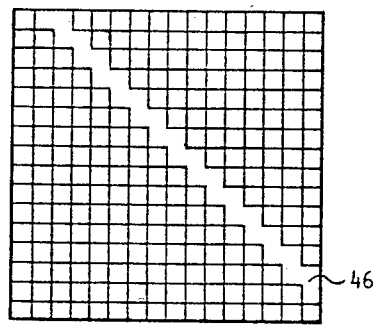

In the present invention, an axial view of the aperture is given in FIG. 4A where a symmetric depth of focus is desired. Concentric rings 41 either individually controlled or via a single analog control (which need not be constrained to discrete annular regions) cause the central aperture 42 to become transparent, or the central aperture plus any selected amount of the immediate surrounding area in ever increasing circles up to the limit of the device. FIG. 4B illustrates how the aperture of the present invention could be designed to provide non-symmetric depth of focus by having aperture 43 wider in one dimension than the other. FIG. 4C illustrates how the aperture 44 could be designed to have a fixed depth of focus in one dimension while variable in the other. FIG. 4D illustrates how a random pattern of blockages 45 can reduce light transmission without affecting depth of field. FIG. 4E illustrates how a light modulator with individual pixel (row-column intersection) control can be used to generate very unique aspect ratios such as the 45 degree aperture 46.

Figure 5:
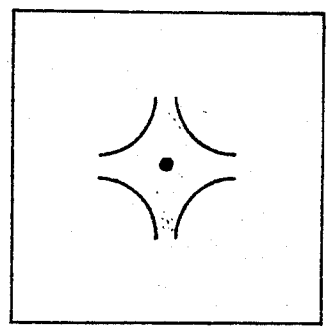
FIG. 5 illustrates a typical transform pattern, in accordance with the present invention.

FIG. 5 illustrates how the aperture could be used to perform mathematical transform filtering of the light which can be used to enhance desired features of the scene such as edges of features in the scene. The light modulator must have local area (pixel) control or pattern control to provide these usually complex patterns of transparency ranging from opaque to clear. The light attenuation or gain can be effected by the controlled transmittance of elements with variable transmittance or controlled length of time for elements that only can produce two values of transmittance.

One well-known transform is the two-dimensional Fourier transform. The light intensity at aperture 5 can be expressed as the Fourier transform of the light intensity at the scene. Placing a light modulation filter function at 5 modifies the intensity passing through 5 to become the product of the transforms of the filter function and scene. This modified intensity pattern is then recorded at the light sensitive area 2 as the inverse Fourier transform of the intensity pattern. This produces an image with properties enhanced/subdued by the filtering.

Since light modulators may not sufficiently block light, a relatively slow light blocking mechanism 8 can be employed to overcome this deficiency.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for electrically controlling depth of focus of a light-sensitive area in an optical device, comprising: a housing with light-sensitive area means; lens means for imaging an object onto said light-sensitive area means; shutter means for controlling exposure time; and aperture means for controlling the amount of light admitted by said housing comprised of electrically-controlled light modular means; said aperture being arranged to perform mathematical transform filtering of light for enhancing predetermined parts of the object.

2. An arrangement for electrically controlling depth of focus of a light-sensitive area in an optical device, comprising: a housing with light-sensitive area means; lens means for imaging an object onto said light-sensitive area means; shutter means for controlling exposure time; and aperture means for controlling the amount of light admitted by said housing comprised of electrically-controlled light modular means; said shutter means and said aperture means comprising a single electrically-controlled light modulator; said aperture being arranged to perform mathematical transform filtering of light for enhancing predetermined parts of the object.

3. An arrangement for electrically controlling depth of focus of a light-sensitive area in an optical device, comprising: a housing with light-sensitive area means; shutter means for controlling exposure time; and aperture means for controlling the amount of light admitted by said housing comprised of electrically-controlled light modulator means, said electrically-controlled light modulator accepting electrical control signals to selectively make predetermined areas of said aperture means transparent, said aperture means being selectively entirely transparent for the exposure period, said electrically-controlled light modulator providing unequal horizontal and vertical depth of focus.

4. An arrangement for electrically controlling depth of focus of a light-sensitive area in an optical device, comprising: a housing with light-sensitive area means; shutter means for controlling exposure time; and aperture means for controlling the amount of light admitted by said housing comprised of electrically-controlled light modulator means, said electrically-controlled light modulator accepting electrical control signals to selectively make predetermined areas of said aperture means transparent, said aperture means being selectively entirely transparent for the exposure period, said electrically-controlled light modulator providing selectively varying depth of focus in predetemined directions.

5. An arrangement for electrically controlling depth of focus of a light-sensitive area in an optical device, comprising: a housing with light-sensitive area means; shutter means for controlling exposure time; and aperture means for controlling the amount of light admitted by said housing comprised of electrically-controlled light modulator means, said electrically-controlled light modulator accepting electrical control signals to selectively make predetermined areas of said aperture means transparent, said aperture means being selectively entirely transparent for the exposure period, said electrically-controlled light modulator providing unequal horizontal and vertical depth of focus, said depth of focus being controlled in one direction relative to another.

6. An arrangement for electrically controlling depth of focus of a light-sensitive area in an optical device, comprising: a housing with light-sensitive area means; shutter means for controlling exposure time; and aperture means for controlling the amount of light admitted by said housing comprised of electrically-controlled light modulator means, said electrically-controlled light modulator accepting electrical control signals to selectively make predetermined areas of said aperture means transparent, said aperture means being selectively entirely transparent for the exposure period, said electrically-controlled light modulator providing selectively varying depth of focus in predetermined directions, said depth of focus being controlled in one direction relative to another.

* * * * *